(12) United States Patent
Coogan et al.

(10) Patent No.: US 11,384,939 B2
(45) Date of Patent: Jul. 12, 2022

(54) AIR-FUEL MICROMIX INJECTOR HAVING MULTIBANK PORTS FOR ADAPTIVE COOLING OF HIGH TEMPERATURE COMBUSTOR

(71) Applicant: Southwest Research Institute, San Antonio, TX (US)

(72) Inventors: Shane B. Coogan, San Marcos, TX (US); Klaus Brun, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 398 days.

(21) Appl. No.: 14/257,847

(22) Filed: Apr. 21, 2014

(65) Prior Publication Data

US 2015/0300647 A1    Oct. 22, 2015

(51) Int. Cl.
```
F23R 3/28    (2006.01)
F02C 9/00    (2006.01)
F02C 9/28    (2006.01)
F03G 6/06    (2006.01)
F03G 6/00    (2006.01)
F23R 3/16    (2006.01)
```
(52) U.S. Cl.
CPC .............. *F23R 3/286* (2013.01); *F03G 6/064* (2013.01); *F23R 3/16* (2013.01); *F23L 2900/15044* (2013.01); *Y02E 10/46* (2013.01)

(58) Field of Classification Search
CPC ...... F02C 9/28; F02C 6/18; F02C 7/22; F02C 1/05; F02C 7/08; F02C 7/228; F23R 3/28; F23R 3/10; F23R 3/343; F23R 3/346; F23R 3/286; F03G 6/04; F03G 6/064; F03G 6/067; F03G 6/06; F03G 6/005

USPC .. 60/203.1, 641.14, 641.8, 641.15, 736, 747
See application file for complete search history.

(56) References Cited

U.S. PATENT DOCUMENTS

| | | | | |
|---|---|---|---|---|
| 3,203,167 A | * | 8/1965 | Green, Jr. ................ | F02C 1/05 126/684 |
| 3,774,395 A | * | 11/1973 | Greune .................... | F02C 7/36 60/39.25 |
| 4,167,856 A | * | 9/1979 | Seidel ..................... | F03G 6/064 60/641.14 |
| 4,189,922 A | * | 2/1980 | Bellofatto ................ | F02C 1/05 60/641.8 |
| 4,499,893 A | * | 2/1985 | Hunt ....................... | F24S 20/20 126/674 |
| 4,735,052 A | * | 4/1988 | Maeda ..................... | F02C 9/28 60/733 |
| 4,777,934 A | * | 10/1988 | De Laquil, III ......... | F03G 6/064 126/678 |
| 5,448,889 A | * | 9/1995 | Bronicki ................. | F02C 1/05 60/641.14 |

(Continued)

*Primary Examiner* — Gideon R Weinerth
(74) *Attorney, Agent, or Firm* — Livingston Law Firm

(57) ABSTRACT

A method of using a combustor for high temperature combustion. The combustor is equipped with a showerhead type micromix air-fuel injector. The injector faceplate has its ports concentrically arranged into "banks", to which delivery of fuel can be controlled on a bank-by-bank basis. During combustor operation, the temperature of the air into the combustor is monitored. If the temperature is above a predetermined threshold, fuel is delivered to fewer than all banks of ports. As a result, the bank(s) of ports to which fuel is not delivered inject only air into the combustion chamber, and the other bank(s) of ports inject the air-fuel mixture as usual.

12 Claims, 6 Drawing Sheets

(56) References Cited

U.S. PATENT DOCUMENTS

| | | | | | |
|---|---|---|---|---|---|
| 5,533,329 | A | * | 7/1996 | Ohyama | F23R 3/26 60/39.27 |
| 5,704,205 | A | * | 1/1998 | Hepner | F02C 9/28 60/39.27 |
| 5,727,379 | A | * | 3/1998 | Cohn | F01K 23/10 60/39.182 |
| 5,778,676 | A | * | 7/1998 | Joshi | F23D 17/002 60/737 |
| 5,901,555 | A | * | 5/1999 | Mandai | F23D 23/00 60/39.826 |
| 6,141,949 | A | * | 11/2000 | Steinmann | F01K 21/047 60/39.182 |
| 6,237,337 | B1 | * | 5/2001 | Bronicki | F01K 23/10 60/39.182 |
| 6,704,620 | B1 | * | 3/2004 | Kutzner | F02C 9/48 60/793 |
| 6,725,665 | B2 | * | 4/2004 | Tuschy | F02C 6/16 60/39.21 |
| 6,755,359 | B2 | * | 6/2004 | Sprouse | F23D 11/107 239/596 |
| 6,813,889 | B2 | * | 11/2004 | Inoue | F23R 3/10 60/737 |
| 6,962,055 | B2 | * | 11/2005 | Chen | F23N 1/002 60/746 |
| 7,107,772 | B2 | * | 9/2006 | Chen | F23R 3/343 60/737 |
| 7,188,476 | B2 | * | 3/2007 | Inoue | F02C 7/22 431/178 |
| 8,613,197 | B2 | * | 12/2013 | Uhm | F02C 7/222 60/737 |
| 8,833,079 | B2 | * | 9/2014 | Smith | F01K 7/16 60/641.14 |
| 8,843,293 | B2 | * | 9/2014 | Rofka | F02C 9/54 60/773 |
| 8,931,279 | B2 | * | 1/2015 | Jeske | F01D 17/148 137/625.46 |
| 9,121,611 | B2 | * | 9/2015 | Koizumi | F23R 3/10 |
| 9,334,808 | B2 | * | 5/2016 | Abe | F02C 6/18 |
| 9,354,618 | B2 | * | 5/2016 | Chandler | F02C 9/40 |
| 9,410,698 | B2 | * | 8/2016 | Mori | F23D 14/08 |
| 9,605,660 | B2 | * | 3/2017 | Wang | F23D 14/24 |
| 9,726,155 | B2 | * | 8/2017 | Anderson | F03G 6/06 |
| 9,784,452 | B2 | * | 10/2017 | Keener | F23R 3/10 |
| 9,850,823 | B2 | * | 12/2017 | Miduturi | F02C 9/28 |
| 9,851,736 | B2 | * | 12/2017 | Sunley | G05F 1/66 |
| 9,856,754 | B1 | * | 1/2018 | Pasch | F01K 7/16 |
| 2001/0047650 | A1 | * | 12/2001 | Muller | F02C 7/228 60/776 |
| 2006/0010876 | A1 | * | 1/2006 | Hoffmann | F02C 7/057 60/773 |
| 2006/0218930 | A1 | * | 10/2006 | Nuding | F02C 7/1435 60/775 |
| 2008/0127647 | A1 | * | 6/2008 | Leitner | F02C 1/007 60/645 |
| 2008/0229755 | A1 | * | 9/2008 | Koganezawa | F01D 25/305 60/775 |
| 2009/0125152 | A1 | * | 5/2009 | Skowronski | F01K 7/40 700/281 |
| 2009/0261592 | A1 | * | 10/2009 | Kay | F03G 6/064 290/52 |
| 2009/0280443 | A1 | * | 11/2009 | Carroni | F23D 11/101 60/742 |
| 2009/0308072 | A1 | * | 12/2009 | Kay | F02C 1/05 60/641.8 |
| 2010/0186412 | A1 | * | 7/2010 | Stevenson | F23D 14/64 60/738 |
| 2010/0186413 | A1 | * | 7/2010 | Lacy | F23R 3/10 60/740 |
| 2011/0076628 | A1 | * | 3/2011 | Miura | F23R 3/10 431/12 |
| 2011/0100004 | A1 | * | 5/2011 | Al-Mazeedi | G05B 13/021 60/641.8 |
| 2011/0127773 | A1 | * | 6/2011 | Freund | F01K 23/10 290/52 |
| 2011/0154829 | A1 | * | 6/2011 | Hayashi | F23D 14/64 60/776 |
| 2011/0185703 | A1 | * | 8/2011 | Dodo | F23D 14/24 60/39.461 |
| 2011/0252797 | A1 | * | 10/2011 | Kobayashi | F02C 1/05 60/641.11 |
| 2013/0133324 | A1 | * | 5/2013 | Reynolds | F03G 6/067 60/641.15 |
| 2013/0152597 | A1 | * | 6/2013 | Durbin | F23R 3/286 60/773 |
| 2014/0090400 | A1 | * | 4/2014 | Stuttaford | F23R 3/16 60/796 |
| 2014/0223906 | A1 | * | 8/2014 | Gee | F03G 6/064 60/641.15 |
| 2014/0238041 | A1 | * | 8/2014 | Crothers | F02C 7/224 60/779 |
| 2014/0260246 | A1 | * | 9/2014 | Fisher | F03G 6/005 60/641.2 |
| 2014/0260268 | A1 | * | 9/2014 | Westmoreland | F23R 3/286 60/737 |
| 2014/0338340 | A1 | * | 11/2014 | Melton | F23D 14/62 60/738 |
| 2014/0338354 | A1 | * | 11/2014 | Stewart | F23R 3/286 60/776 |
| 2014/0338356 | A1 | * | 11/2014 | Keener | F23R 3/286 60/776 |
| 2015/0000277 | A1 | * | 1/2015 | Reynolds | F03G 6/067 60/641.15 |
| 2015/0033760 | A1 | * | 2/2015 | Koyama | F02C 1/05 60/801 |
| 2015/0059348 | A1 | * | 3/2015 | Toronto | F02C 7/228 60/772 |
| 2015/0184858 | A1 | * | 7/2015 | Stuttaford | F02C 9/26 60/776 |
| 2015/0192112 | A1 | * | 7/2015 | Dahlquist | F03G 6/067 60/641.11 |
| 2015/0241064 | A1 | * | 8/2015 | Boardman | F23R 3/283 60/737 |
| 2016/0003141 | A1 | * | 1/2016 | Andersson | F02C 1/05 60/736 |
| 2016/0032900 | A1 | * | 2/2016 | Mishima | F03D 9/007 290/36 R |
| 2016/0033134 | A1 | * | 2/2016 | Johnson | F23R 3/286 60/740 |
| 2016/0040883 | A1 | * | 2/2016 | Asai | F23R 3/10 60/737 |
| 2016/0084169 | A1 | * | 3/2016 | Stuttaford | F23R 3/343 60/776 |
| 2016/0215703 | A1 | * | 7/2016 | Childers | F02C 9/28 |
| 2016/0222816 | A1 | * | 8/2016 | Chen | F01D 17/04 |
| 2018/0106192 | A1 | * | 4/2018 | Sane | F02C 3/34 |
| 2018/0195498 | A1 | * | 7/2018 | Anderson | F03G 6/064 |
| 2018/0209306 | A1 | * | 7/2018 | Heid | F01K 25/005 |

* cited by examiner

AIR-FUEL MICROMIX INJECTOR HAVING MULTIBANK PORTS FOR ADAPTIVE COOLING OF HIGH TEMPERATURE COMBUSTOR

GOVERNMENT RIGHTS CLAUSE

This invention was made with United States Government support under Contract No. DE-EE0005805 awarded by the Department of Energy. The Government has certain rights in this invention.

TECHNICAL FIELD OF THE INVENTION

The invention relates to high temperature combustors, and more particularly to an injector having a multibank micromix face plate.

BACKGROUND OF THE INVENTION

Concentrated solar power (CSP) systems use mirrors or lenses to concentrate a large area of sunlight (solar thermal energy) onto a small area. Electrical power is produced when the concentrated light is converted to heat, which drives a heat engine (such as a turbine) connected to a power generator.

An example of a CSP system is a large scale electrical power plant having a solar receiver in a field of solar collectors. Mirrors or lenses with tracking systems are used to focus sunlight to the receiver. The concentrated light is then used as a heat source for an energy transfer to a turbine. The turbine generates shaft power for electricity generation.

A Brayton thermodynamic cycle uses air as the working fluid, and is commonly used in natural gas power generation turbines. Brayton cycles can also be used in CSP plants, with natural gas used as a supplemental heat source for combustion. In this configuration, air is first heated by the solar receiver. It is then further heated to the allowable turbine temperature with a natural gas combustor. The combustor, as a secondary natural gas heat source, allows a constant power output to be maintained even with variations in solar energy due to nighttime, clouds, and other weather conditions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As stated in the Background, one application of CSP is a gas turbine power plant that uses a natural gas combustor as an additional heat source. These systems are sometimes referred to as "hybrid solar-natural gas power generation systems". Such systems may be implemented with Brayton cycle combustion equipment.

Conventional solar receivers operate at temperatures up to about 800° C. Conventional gas turbine combustors are limited to a maximum inlet temperature of about 650° C. Both of these temperatures need to be increased to 1,000° C. to improve the cost competitiveness of CSP power as an electrical energy source.

This description is directed to a natural gas combustor that is suitable for operation over a wide range of inlet air temperatures. A target operating range is a range of 600° C.-1,000° C. The combustor provides efficient management of airflow and fuel input needs that vary with inlet air temperature fluctuations. These features ensure that the combustor is compatible with CSP systems.

More specifically, the combustor is equipped with a special air-fuel injector that allows the combustor to be paired with a high temperature solar receiver. As explained below, the injector may be described as a "multibank micromix injector with adaptive cooling".

Figure 1:
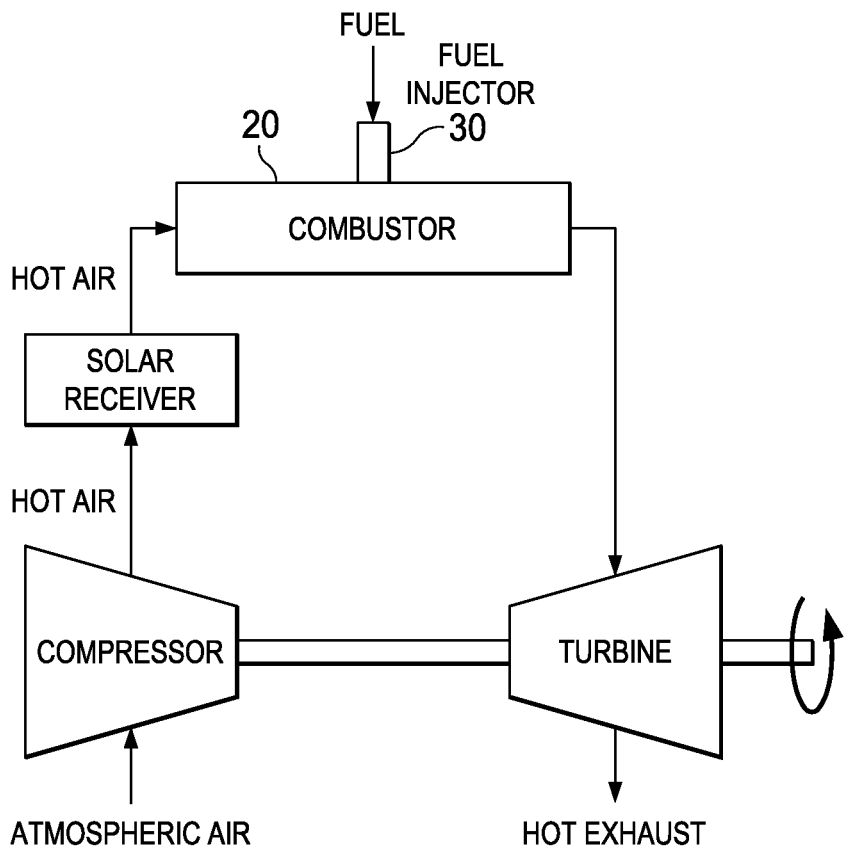
FIG. 1 illustrates the basic elements of a Brayton cycle combustion system as applied to CSP.

FIG. 1 illustrates the basic elements of a Brayton cycle combustion system as applied to CSP. Ambient air enters a compressor, is compressed and initially heated by a solar receiver. Hot air from the solar receiver is delivered to a combustor, where it is mixed with fuel. The air-fuel mixture is then ignited in the combustor and the energy thereby released drives a turbine.

Figure 2:
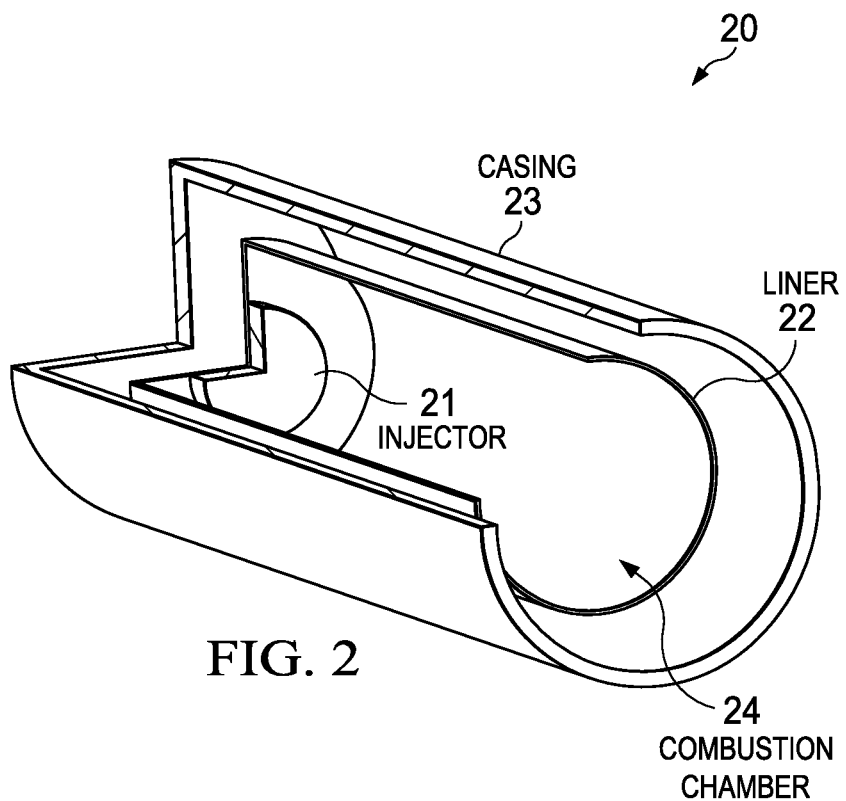
FIG. 2 illustrates the basic elements of a combustor for a CSP system.

FIG. 2 illustrates the basic elements of a combustor 20 suitable for a hybrid CSP system. In this example, combustor 20 has a liner 22, but as explained below, the injector 21 of the present invention may be used in a combustor with or without a liner.

Combustor 20 is a can type combustor, and in addition to injector 21 has an igniter (not shown), liner 22 and casing 23. Ignition may be provided by various means, such as by a small diameter heating element or flame jet extending across the face of the injector.

Primary input air is mixed with fuel at the injector 21, and then enters the combustion chamber 24 where it is ignited. Secondary air may also enter the combustor 20 from outside of the liner 22, to cool the liner.

As illustrated, injector 21 is located at the input end of the combustor. It is a "showerhead" type micro-mix injector, having an outer perimeter that corresponds to an inner circumference of the input end of the combustion chamber. Any fluid entering the combustion chamber 24 enters via the injector 21 through an array of small (micro) ports. The various components of the injector 21 are explained below.

For combustors having a liner, such as combustor 20, the liner 22 contains the combustion process, and is designed to withstand extended high temperatures. Liner 22 may be cooled with air flow. Film cooling works by injecting air along the surface of the liner to create a thin film of air that protects the liner. Transpiration cooling uses a porous material for the liner that allows cooling air to impinge against the liner for heat exchange.

Figure 3:
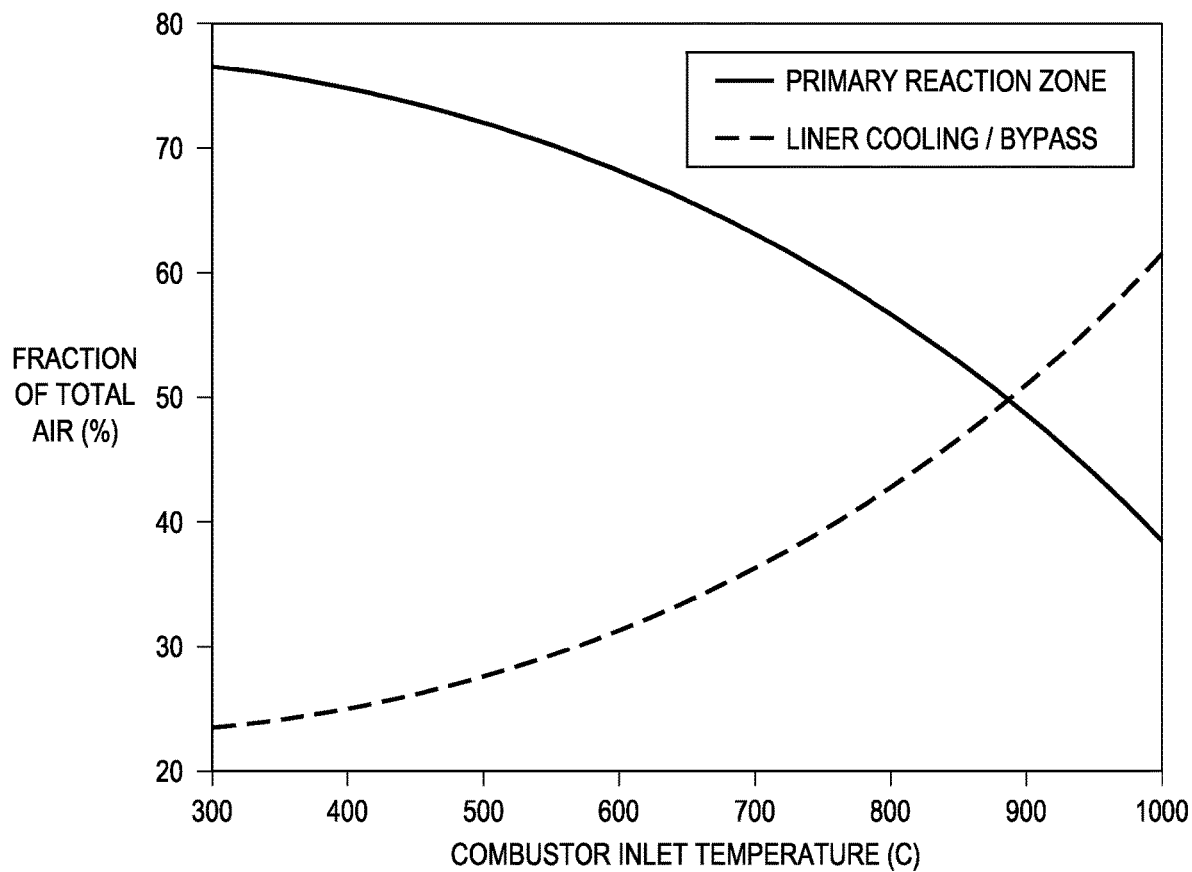
FIG. 3 plots typical combustor airflow requirements as a function of combustor inlet temperature.

FIG. 3 plots typical combustor airflow requirements as a function of combustor inlet temperature. This plot assumes that the overall outlet temperature of the combustor, that is, the turbine inlet temperature, is fixed. At low combustor inlet temperatures (<600° C.), 70% or more of the air goes to the primary reaction zone to burn with fuel. As the inlet temperature increases (up to 1,000° C.), less heating is required and less than 40% of the air participates in the reaction.

At low inlet temperatures, the low quantity of cold air results in film cooling being inefficient and cool air can quench the desired carbon monoxide oxidation reaction. Direct impingement of cool air through the liner for heat exchange with combustion gas is desirable. At high inlet temperatures, there is less quenching risk and liberal film cooling can bathe the liner with cooler air.

As stated above, for a hybrid CSP system, it is desired for the combustor to operate over a wide high temperature range, such as 600° C.-1,000° C. Solutions are needed to not only accommodate the variable air flow, but to also make the best use of excess air.

Figure 4:
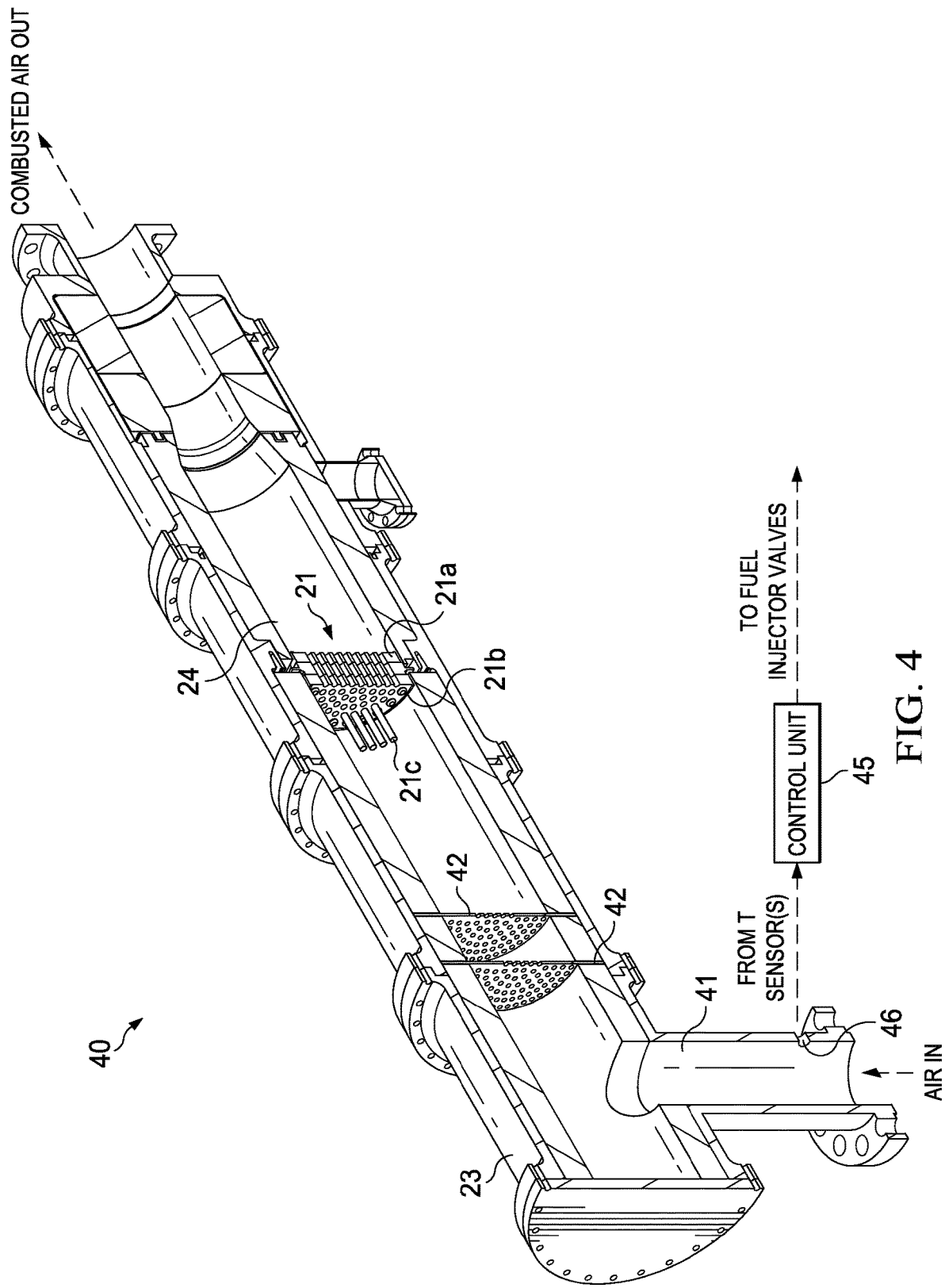
FIG. 4 is another example of a combustor, having a fuel injector in accordance with the invention.

FIG. 4 illustrates a combustor 40, also having a fuel injector 21 in accordance with the invention. In this embodiment, combustor 40 does not have a liner, as does the combustor of FIG. 2. Other means than a liner may be used to insulate the combustor walls, such as refractory inserts.

Air from the solar receiver enters at inlet 41, and passes through one or more perforated plates 42 (diffusers). Air and fuel are mixed within injector 21. A fuel supply (not shown) delivers fuel to the injector 21. The air-fuel mixture enters the combustion chamber 24 where it is ignited. The combusted air exits to the turbine.

As stated above, injector 21 is a micro-mix type injector, having a grid of small air-fuel injection ports. This micromix design reduces mixing length, and puts many small burning points into the combustion chamber 24. The result is lowered emissions and reduced likelihood of auto ignition and flashback.

Injector 21 has a faceplate 21a, which is the side of the injector facing into the combustion chamber 24. A number of ports in the faceplate 21a inject an air-fuel mixture into the combustion chamber 24. A backplate 21b has means for receiving air and fuel, for mixing of the air and fuel, and for delivery of the air-fuel mixture to the ports of the faceplate 21a for further injection into the combustion chamber 24. As explained below, backplate 21b may have various internal passages for this purpose. Fuel delivery lines 21c deliver fuel from a source reservoir (not shown) to the backplate 21b.

A control unit 45 controls the delivery of fuel to injector 21. As explained below, fuel delivery is determined by air temperature at the inlet to the combustor. Thus, control unit 45 receives input from one or more temperature sensors 46, and delivers control signals to valves or other means (not shown) for turning fuel delivery on or off to the backplate 21b. Control unit 45 has appropriate hardware and software for performing the tasks to implement the use of injector 21 as described herein.

A temperature sensor 46 measures the temperature of the air into the combustor. This temperature data is delivered to the control unit 45 on a continuous or regular basis while the combustor 40 is in operation.

Figure 5:
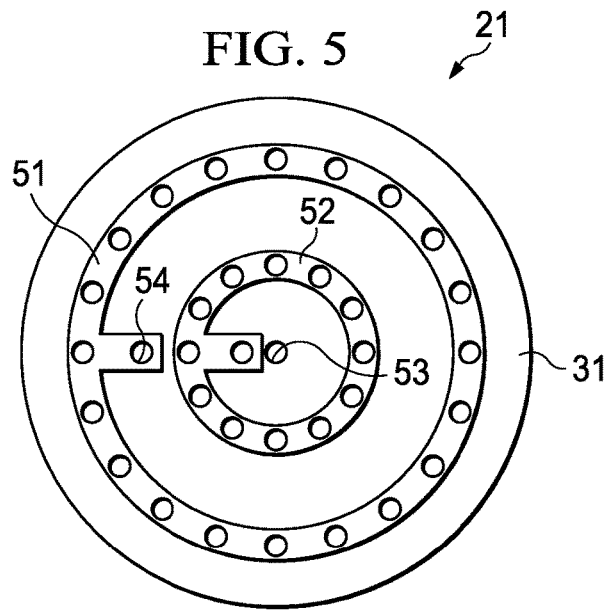
FIG. 5 is a front (face) view of the injector, showing two banks of injection ports.

FIG. 5 is a front view of injector 21, showing its faceplate 21a and injection ports into combustion chamber 24. As illustrated, injector 21 divides the injection ports into multiple concentric banks. In the example of FIG. 5, two banks, outer bank 51 and inner bank 52, are shown. Each bank has a single circular row of ports, arranged concentrically. In other embodiments, the injection ports could be divided into additional banks. Each bank may have more than one row of ports. The ports of each row are typically, but not necessarily, evenly spaced. The radial distance between rows need not be regular.

A pilot port 53 is located in the center of the injector faceplate 21a. One or more bridge ports 54 connects each bank of ports to each other and to the pilot port 53.

In operation, for low inlet temperatures, the ports of both the outer bank 51 and inner bank 52 are "on" to deliver air-fuel into the combustion chamber. "On" means that fuel is provided to the bank, so that the ports of that bank inject an air-fuel mix into the combustion chamber 24. For high input temperatures, fuel is "off" for the outer bank 51 and "on" for the inner bank 52. As a result, for high input temperatures, the outer bank 51 injects only air into the combustion chamber 24.

Figure 6:
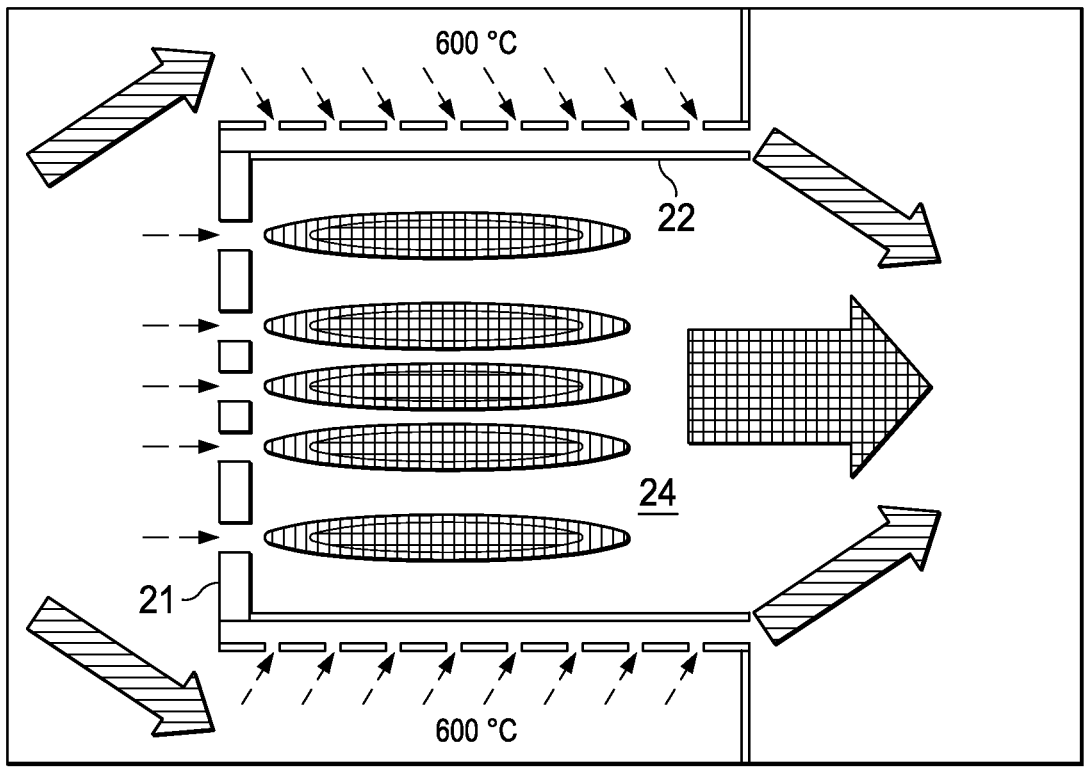
FIGS. 6 and 7 illustrate the operation of the injector, at lower (600 degrees C.) and higher (1000 degrees C.) temperatures, respectively.
Figure 7:
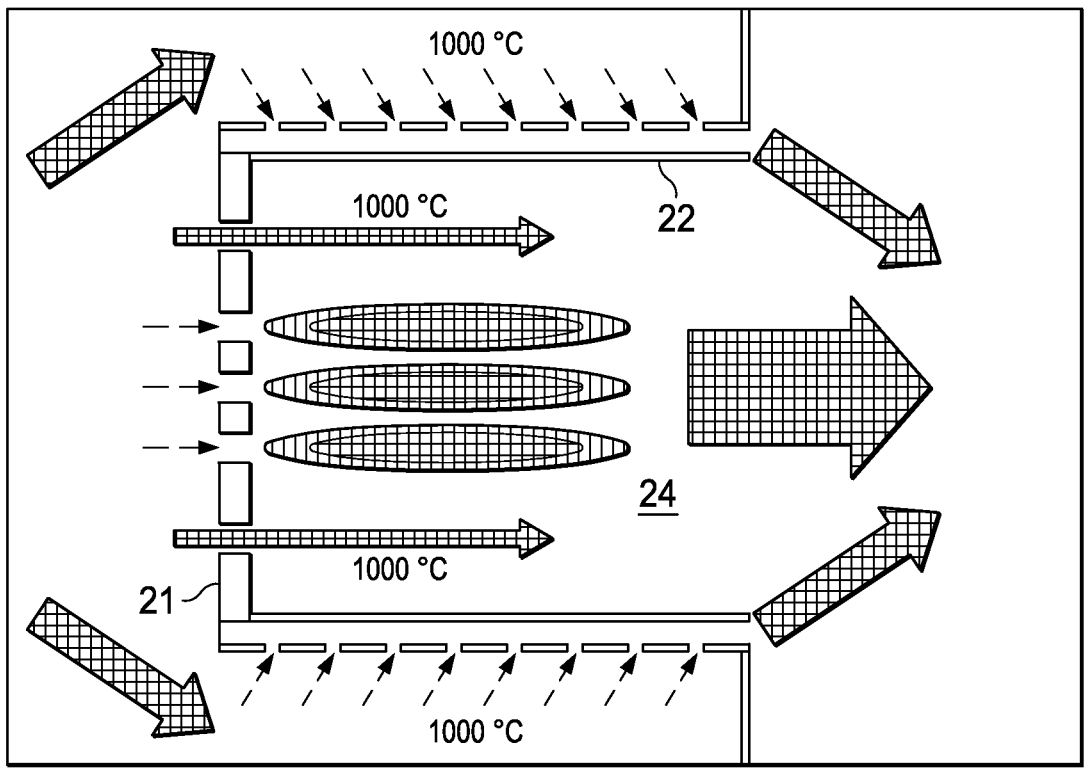

FIGS. 6 and 7 illustrate the operation of injector 21, at lower (600 degrees C.) and higher (1000 degrees C.) respectively. These figures assume the presence of a liner having cooling ports around its outer surface, but as stated above, injector 21 may also be used with combustors not having a liner.

The large arrows indicate the general direction of air flow. The narrow arrows indicate specific air flow through the injector ports and liner cooling ports. In FIG. 6, the flow of cooler air is indicated by the diagonally shaded arrows.

Baseline cooling for liner 22 is provided by impingement or convection cooling. For all inlet temperatures, the amount of air split between the liner 22 and ports of injector 21 is fixed. The air flowing through the injector ports is fixed by the geometry of the combustor and is the same for all inlet temperatures. A typical combustion temperature is above 1400 degrees C.

In FIG. 6, with the inlet air at 600 degrees C., fuel is provided to all injector ports (both outer bank 51 and inner bank 52) so that all of the air participates in combustion. The liner 22 is cooled by convection from the 600° C. air.

In FIG. 7, with the inlet air at 1000 degrees C., less air is needed for combustion. Fuel is shut-off to the outer bank 51 of injector ports. Air still flows through these injector ports, but now serves as a 1,000 degrees C. film cooling barrier to the hotter gases located near the inner bank 52. As before, some air cools the liner from external convection. This combination of airflows keeps the liner temperature within the capability of metallic materials. Combustion at the inner bank 51 of injector ports is undisturbed.

At temperatures between 600 and 1000 degrees C., the "on" or "off" state of the outer and inner banks of injector ports can be controlled depending on a desired use of air for cooling and combustion. If there are more than two banks, delivery of fuel to the outer banks can be turned off incrementally as the air temperature into the combustor rises.

The adaptive cooling of liner 22 allows combustor and liner to be made from metallic materials. Various high performance alloys commonly used for high temperature combustors, may be suitable, with an example being a Haynes alloy. Various bond coatings may be applied to prevent oxidation.

Referring again to FIG. 5, the inner and outer banks of injector ports are separated by some distance to limit mixing between hot and cooler gases while reactions are occurring. The amount of hot-cold mixing is expected to be minimal because of this separation, and because of the very short flame lengths established by the micromix design.

In combustors not having a liner, such as the combustor 40 of FIG. 4, the same concepts apply. In general, the temperature of the combustor input air will determine how many banks of ports for which fuel is "on". As the input temperature increases, fuel can be turned "off" for one or more banks, so that air, and not an air-fuel mix, is injected into the combustion chamber from that bank of ports.

Figure 8:
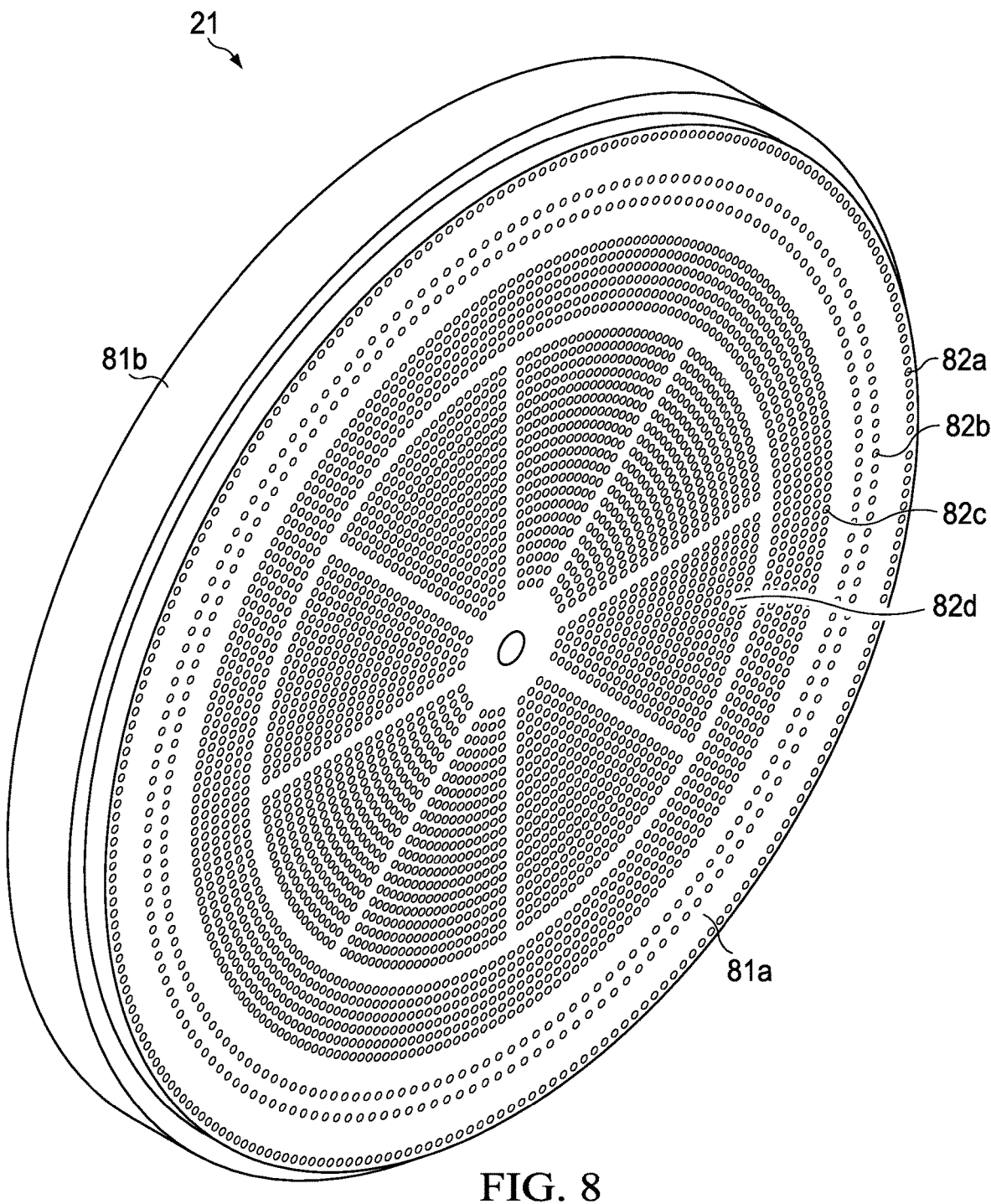
FIG. 8 is a perspective view of an injector having four banks of injector ports.

FIG. 8 illustrates an injector 21 having a faceplate 81a with four banks of injector ports. An outer bank 82a, two mid banks 82b and 82c, and an inner bank 82d have varying numbers of rows. Depending on the inlet air temperature, these banks can be incrementally opened or closed. Typically, the banks will be incrementally closed from the outer bank inward as the combustor air input temperature rises.

As explained above, when a bank is closed, air and not fuel passes through the ports of that bank. In actual implementation, an example of a faceplate 81a might be one with an outer diameter of about 18 cm, with 750 ports having 4 mm diameters.

The number of banks, as well as the number of rows in each bank, may vary. FIGS. 5 and 8 are just two examples, showing two and four banks of ports, respectively. A common feature, however, is that fuel delivery to the banks may be controlled on a bank-by-bank basis. Each bank may comprise one or more concentric rows of ports. As stated above, control unit 45 is operable to deliver control signals to valves or other control means to turn delivery of fuel to each bank on or off.

Figure 10:
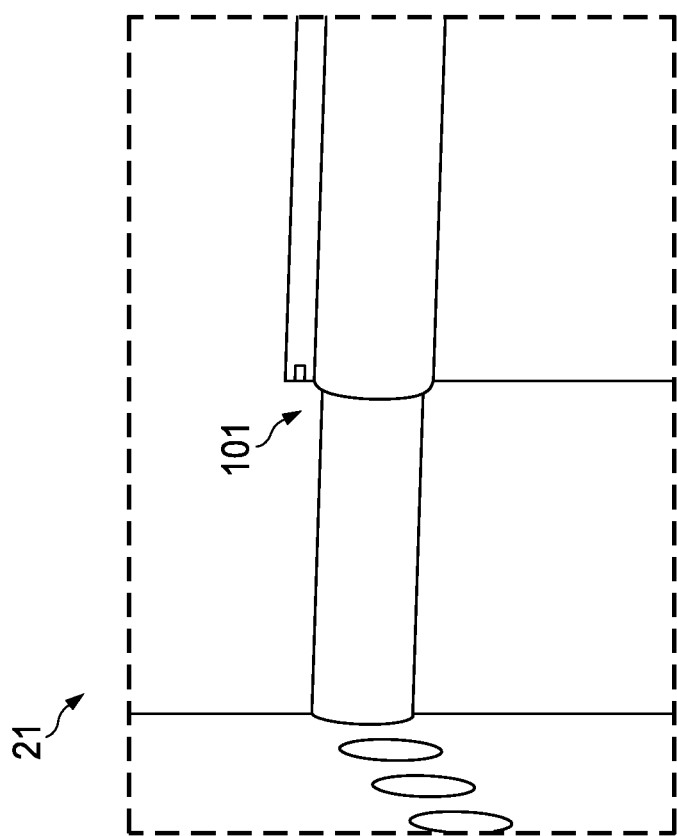
FIGS. 9 and 10 illustrate an example of fuel delivery channels within the injector.
Figure 9:
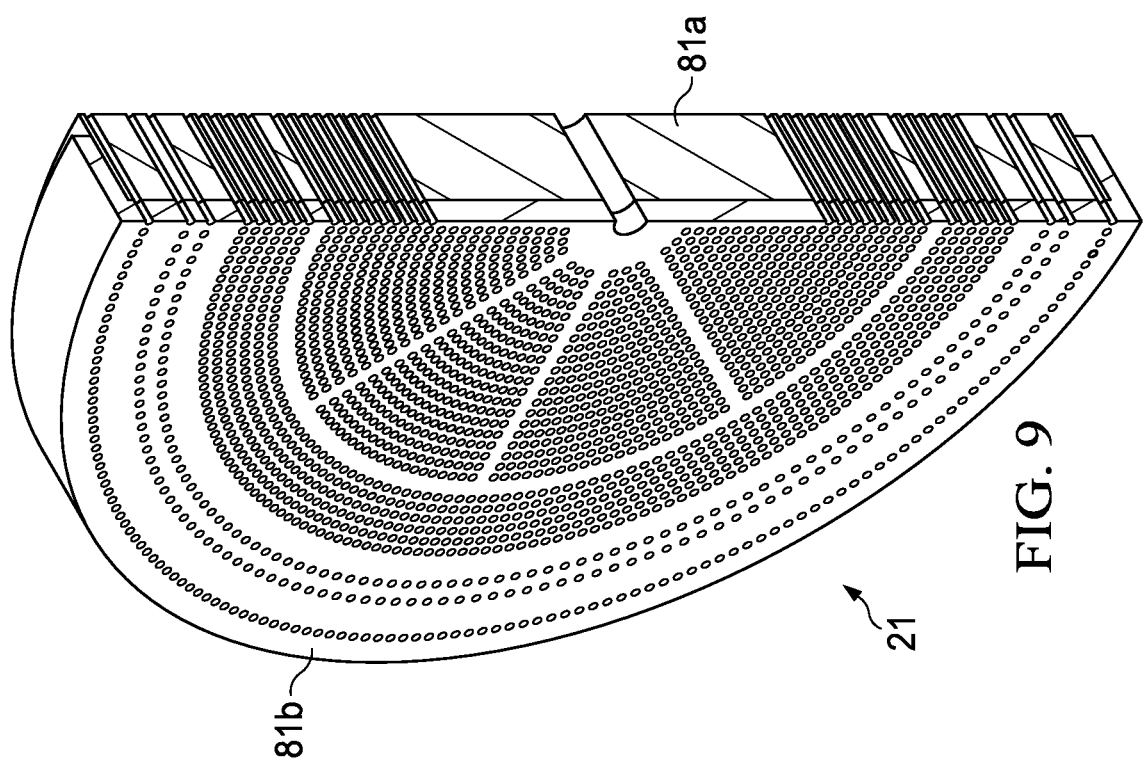

FIGS. 9 and 10 are side perspective views of injector 21 with faceplate 81a and backplate 81b. FIG. 9 is a side cross section, and FIG. 10 is a partial cross section. As illustrated in FIG. 10, fuel channels 101 are machined into both injector plates to allow delivery of fuel into the combustion chamber 24.

Various delivery and micro-mixing configurations may be used to deliver air and fuel into injector 21 and to mix the fuel with air. In the example of this description, each bank of ports has a fuel manifold that distributes fuel to a mixing passage within the injector. The fuel is injected as a small cross jet into the first portion of each mixing passage. There is a fuel delivery line to each bank.

In summary, injector 21 adaptively redistributes air between combustion and cooling without any high temperature parts. Adaptive cooling allows durable metallic materials to be used for the combustor interior despite very high air temperatures. A lack of moving parts minimizes response times for counteracting solar transients and maximizes high temperature durability. The injector provides a solution necessary for hybrid CSP power systems to operate with a 600° C.-1,000° C. combustor inlet temperature range. These inlet temperatures are needed for cost-competitive hybrid CSP power generation.

What is claimed is:

1. A method of providing high temperature intake air to a gas turbine power plant, using a combustor for high inlet temperature combustion, comprising:
   using a compressor to pressurize air;
   using a solar receiver to receive all of the pressurized air from the compressor and to heat the pressurized air with sunlight;
   delivering the output of the solar receiver to a combustor;
   wherein the combustor has an outer casing, a micro-mix injector and a combustion chamber with an inner wall;
   wherein the outer casing has an inlet port at an upstream end that receives the output of the solar receiver and thereby receives all air into the combustor, and further has an output port at a downstream end for outputting an exhaust product of combustion;
   wherein the micro-mix injector has a faceplate and a backplate with air passages running from the backplate to the faceplate, the air passages configured as having at least two concentrically arranged banks of ports at the faceplate, with two of the banks being an inner bank of ports and an outer bank of ports, each port operable to deliver an air-fuel mixture into the combustion chamber, and the outer bank of ports arranged to direct air or air-fuel mix along the inner wall;
   wherein each bank of ports has at least one associated fuel line that delivers fuel into the air passages, such that air and fuel are mixed between the faceplate and the backplate and the ports deliver an air-fuel mixture into the combustion chamber;
   wherein the micro-mix injector and the combustion chamber aligned within the casing, with the micro-mix injector in-line with and upstream of the combustion chamber on an axis;
   wherein the combustor is configured such that during operation of the combustor all airflow into the combustor enters the combustor upstream of the micro-mix injector and then through the micro-mix injector and then through the combustion chamber from upstream to downstream in a single direction along the axis and such that all flow of air and/or combustion product exiting the micro-mix injector is from the faceplate in a direction parallel to the inner wall;
   determining an inlet temperature threshold; and
   during operation of the combustor: determining the inlet temperature of the air into the inlet port of the combustor; and if the temperature is above the inlet temperature threshold, delivering fuel to only the inner bank of ports, such that only air enters the combustion chamber from the outer bank of ports and flows along an outer circumference of the inner wall and the air-fuel mixture enters the combustion chamber from the inner bank of ports.

2. The method of claim 1, wherein the combustion chamber has refractory inserts for cooling.

3. The method of claim 1, wherein the faceplate further has a central port for a pilot flame.

4. The method of claim 1, wherein the faceplate further has at least one bridge port to connect pairs of banks.

5. The method of claim 1, wherein the delivering step is performed incrementally as the inlet temperature of the combustor rises.

6. The method of claim 1, wherein the wall of the combustor is a combustor liner.

7. A combustor system for receiving solar-heated air from a solar receiver and for providing exhaust gas products for driving a gas turbine of a power generator, comprising:
   a combustor that combusts an air-fuel mixture, and having: an outer casing. a micro-mix injector, and a combustion chamber with an inner wall;
   wherein the outer casing has an inlet port at an upstream end that receives the output of the solar receiver and thereby receives all air into the combustor and further has an output port at a downstream end for outputting an exhaust product of combustion;
   wherein the micro-mix injector has a faceplate and a backplate with air passages running from the backplate to the faceplate, the air passages configured as having at least two concentrically arranged banks of ports at the faceplate, with two of the banks being an inner bank of ports and an outer bank of ports, each port operable to deliver an air-fuel mixture into the combustion chamber;

wherein each bank of ports has at least one associated fuel line that delivers fuel into the air passages, such that air and fuel are mixed between the faceplate and the backplate and the ports deliver an air-fuel mixture into the combustion chamber;

wherein the micro-mix injector and the combustion chamber are aligned within the casing, with the micro-mix injector in-line with and in front of the combustion chamber on an axis;

wherein the combustor is configured such that during operation of the combustor, all airflow into the combustor enters the combustor upstream of the micro-mix injector via the inlet port and then all airflow within the combustor flows first through the micro-mix injector and then through the combustion chamber in a single direction along the axis and such that all flow of air and/or combustion product exiting the micro-mix injector is from the faceplate in a direction parallel to the inner wall;

means for delivery of fuel to the injector, operable to turn fuel delivery on or off to the banks of ports;

an igniter for igniting the air-fuel mixture within the combustion chamber; and a control unit operable to store data representing an inlet temperature threshold, to receive temperature data representing the temperature of the combustion air at the input to the combustor and to turn fuel delivery on or off, on a bank-by-bank basis, in response to the temperature data, and to turn off fuel delivery to the outer bank of ports when the temperature of the combustion air at the input to the combustor exceeds the inlet temperature threshold.

8. The combustor of claim 7, wherein the combustion chamber has refractory inserts for cooling.

9. The combustor of claim 7, wherein the faceplate further has a central port for a pilot flame.

10. The combustor of claim 7, wherein the faceplate further has at least one bridge port to connect pairs of banks.

11. The combustor of claim 7, wherein the injector has more than two banks, and the delivering step is performed incrementally as the inlet temperature of the combustor rises.

12. The system of claim 7, wherein the wall of the combustor is a liner.

* * * * *